(12) United States Patent
Parak et al.

(10) Patent No.: US 11,959,374 B2
(45) Date of Patent: Apr. 16, 2024

(54) EVENT PREDICTION USING STATE-SPACE MAPPING DURING DRILLING OPERATIONS

(71) Applicant: LANDMARK GRAPHICS CORPORATION, Houston, TX (US)

(72) Inventors: Mahdi Parak, Katy, TX (US); Srinath Madasu, Houston, TX (US); Egidio Marotta, Houston, TX (US); Dale McMullin, Roanoke, TX (US); Nishant Raizada, Richmond, TX (US)

(73) Assignee: Landmark Graphics Corporation, Houston, TX (US)

( * ) Notice: Subject to any disclaimer, the term of this patent is extended or adjusted under 35 U.S.C. 154(b) by 701 days.

(21) Appl. No.: 17/256,164

(22) PCT Filed: Feb. 3, 2020

(86) PCT No.: PCT/US2020/016431
§ 371 (c)(1),
(2) Date: Dec. 24, 2020

(87) PCT Pub. No.: WO2021/158207
PCT Pub. Date: Aug. 12, 2021

(65) Prior Publication Data
US 2022/0003108 A1 Jan. 6, 2022

(51) Int. Cl.
*E21B 44/02* (2006.01)
*G05B 13/02* (2006.01)
(Continued)

(52) U.S. Cl.
CPC .......... *E21B 44/02* (2013.01); *G05B 13/0265* (2013.01); *G05B 13/042* (2013.01);
(Continued)

(58) Field of Classification Search
CPC .. E21B 44/02; E21B 2200/20; E21B 2200/22; E21B 47/00; E21B 44/00;
(Continued)

(56) References Cited

U.S. PATENT DOCUMENTS 7,762,131 B2 7/2010 Ibrahim et al.
8,677,831 B2 3/2014 Chan et al.
(Continued)

FOREIGN PATENT DOCUMENTS

WO WO-2013169256 A1 11/2013
WO WO 2019/040091 A1 2/2019
WO WO-2019094037 A1 5/2019

OTHER PUBLICATIONS

Korean Intellectual Patent Office, PCT/US2020/016431, International Search Report and Written Opinion, dated Sep. 7, 2020, 10 pages, Korea.
(Continued)

*Primary Examiner* — Shon G Foley
(74) *Attorney, Agent, or Firm* — Kilpatrick Townsend & Stockton LLP

(57) ABSTRACT

System and methods for event prediction during drilling operations are provided. Regression data associated with coefficients of a predictive model are retrieved for a downhole event during a drilling operation along a planned path of a wellbore. The regression data includes a record of changes in historical coefficient values associated with prior occurrences of the event. As the wellbore is drilled over different stages of the operation, a value of an operating variable is estimated based on values of the coefficients and real-time data acquired during each stage. A percentage change in coefficient values adjusted between successive stages of the operation is tracked. An occurrence of the downhole event is estimated, based on a correlation between the percentage change tracked for at least one coefficient and (Continued)

a corresponding change in the historical coefficient values. The path of the wellbore is adjusted, based on the estimated occurrence of the event.

20 Claims, 10 Drawing Sheets

(51) Int. Cl.
 *G05B 13/04* (2006.01)
 *G06N 20/00* (2019.01)

(52) U.S. Cl.
 CPC .......... *G05B 13/048* (2013.01); *G06N 20/00* (2019.01); *E21B 2200/20* (2020.05); *E21B 2200/22* (2020.05)

(58) Field of Classification Search
 CPC ... E21B 41/00; G05B 13/0265; G05B 13/042; G05B 13/048; G06N 20/00; G06Q 10/0637; G06Q 50/02
 See application file for complete search history.

(56) References Cited

U.S. PATENT DOCUMENTS

| | | |
|---|---|---|
| 2009/0132458 A1* | 5/2009 | Edwards ............... G06N 5/025 |
| | | 702/9 |
| 2010/0211423 A1 | 8/2010 | Hehmeyer |
| 2014/0110167 A1 | 4/2014 | Goebel et al. |
| 2015/0218914 A1 | 8/2015 | Marx et al. |
| 2015/0226049 A1 | 8/2015 | Frangos et al. |
| 2015/0315897 A1 | 11/2015 | Samuel et al. |
| 2015/0369042 A1 | 12/2015 | Samuel et al. |
| 2016/0237810 A1 | 8/2016 | Beaman, Jr. et al. |
| 2016/0362971 A1 | 12/2016 | Benson et al. |
| 2017/0284186 A1 | 10/2017 | Samuel et al. |
| 2019/0048703 A1 | 2/2019 | Samuel et al. |
| 2020/0174149 A1* | 6/2020 | Thiruvenkatanathan .................... |
| | | G01V 1/001 |

OTHER PUBLICATIONS

Willersrud, Anders; Blanke, Mogens; Imsland, Lars; Pavlov, Alexey K., Technical University of Denmark, Fault diagnosis of downhole drilling incidents using adaptive observers and statistical change detection, Journal of Process Control, Oct. 15, 2014, 39 pages, Denmark. Downloaded from orbit.dtu.dk on Mar. 18, 2018.

Search Report issued for United Kingdom Patent Application No. GB2018524.5, dated Jul. 19, 2021, 1 page.

* cited by examiner

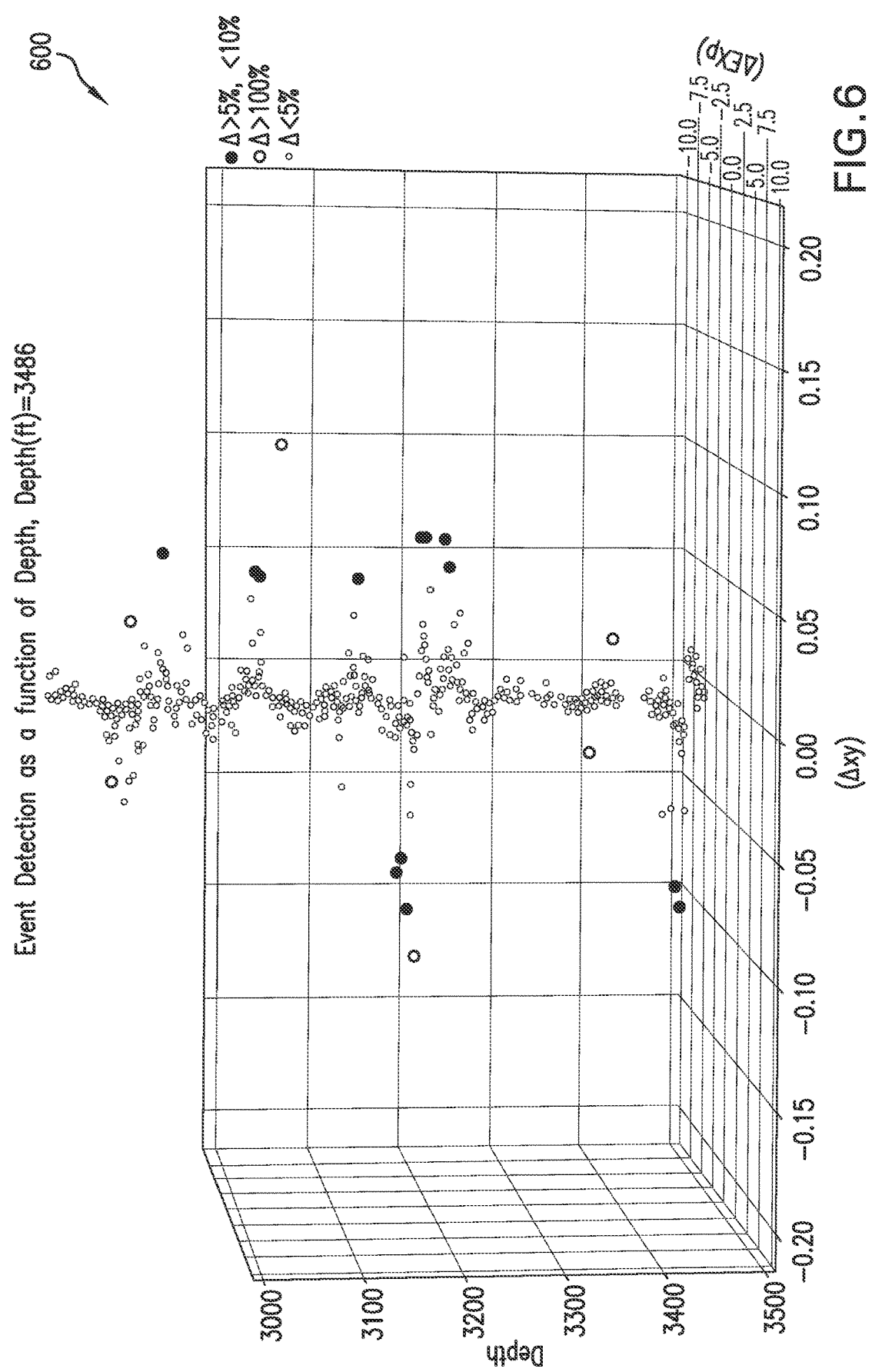

EVENT PREDICTION USING STATE-SPACE MAPPING DURING DRILLING OPERATIONS

CROSS-REFERENCE TO RELATED APPLICATIONS

This application is a U.S. national stage patent application of Iinternational Patent Application No. PCT/US2020/016431, filed on Feb. 3, 2020, the benefit of which is claimed and the disclosure of which is incorporated herein by reference in its entirety.

FIELD OF THE DISCLOSURE

The present disclosure relates generally to well planning and control during drilling operations and particularly, to real-time fault prediction during drilling operations.

BACKGROUND

To obtain hydrocarbons, such as oil and gas, a wellbore is drilled into a hydrocarbon bearing rock formation by rotating a drill bit attached to a drill string. The drill bit is mounted on the lower end of the drill string as part of a bottomhole assembly (BHA) and is rotated by rotating the drill string at the surface, by actuation of a downhole motor, or both. With weight applied by the drill string, commonly referred to as weight-on-bit (WOB), the rotating drill bit penetrates the formation at a calculated rate of penetration (ROP) and forms a wellbore toward a target zone. During the drilling process, drilling fluids are circulated to clean the cuttings while the drill bit is penetrated through the formation.

A number of sensors or measurement devices may be placed in close proximity to the drill bit to measure downhole operating parameters associated with the drilling and downhole conditions. The measurements captured by such sensors may be transmitted to a computing device of a drilling operator at the surface of the wellbore for purposes of monitoring and controlling the drilling of the wellbore along a planned path over different stages of a drilling operation. When making decisions for effectively planning and implementing a well plan, the drilling operator may need to constantly monitor and adjust various parameters to account for changes in downhole conditions as the wellbore is drilled through different layers of the formation. One goal of such monitoring and adjustment is to avoid certain events, such as drill bit damage, that could lead to Non-Productive Time (NPT) and Invisible Lost Time (ILT). Another goal is to detect changes in formation characteristics such as formation properties, lithology, presence of natural fractures etc. during drilling operations. However, this may prove to be difficult due to the complexity of the underlying physics and engineering aspects of the drilling process in addition to the inherent uncertainty of the data captured at the surface and downhole.

BRIEF DESCRIPTION OF THE DRAWINGS

FIG. 6 is a three-dimensional plot of a percentage change in coefficients of a rate of penetration (ROP) model as a function of depth.

DESCRIPTION OF ILLUSTRATIVE EMBODIMENTS

Figure 1:
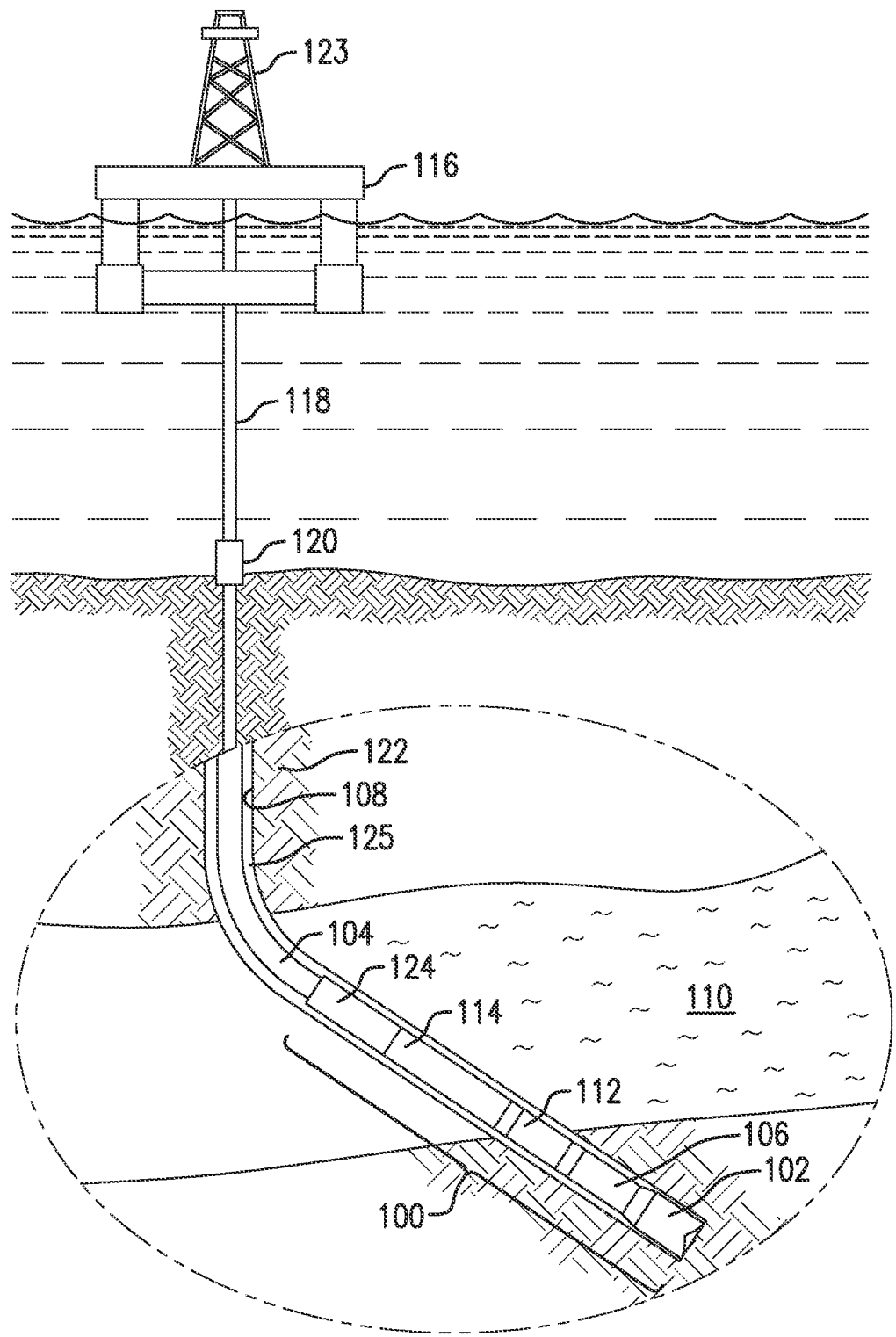
FIG. 1 is a diagram of an offshore drilling system in accordance with one or more embodiments of the present disclosure.

Embodiments of the present disclosure relate to predicting events of interest using state-space mapping of regression coefficients of a predictive model during drilling operations within a subsurface formation. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure combine state-space mapping techniques with predictive models to estimate occurrences of a downhole event of interest during a drilling operation within a subsurface formation. The downhole event may be any abnormal or unexpected change in downhole operating conditions that can affect or impede the progress of the drilling operation. Examples of such an event include, but are not limited to, a change in lithology or other characteristics of the subsurface formation, a kick along the path of a wellbore being drilled within the subsurface formation, a failure of drilling equipment during the drilling operation, and any other downhole condition that can lead to Non-Productive Time (NPT) and Invisible Lost Time (ILT) during a drilling operation.

In one or more embodiments, regression data associated with regression coefficients of a predictive model for the downhole event may be used to track changes in formation characteristics that can lead to the event during the drilling operation. For example, the regression data may include a record of historical changes in coefficient values associated with prior occurrences of the downhole event detected during previous drilling operations. The regression data may be stored in a database that includes a repository of regression coefficients (or "regressors") associated with various downhole events of interest.

In one or more embodiments, the predictive model may be used to estimate values of an operating variable of the drilling operation as a wellbore is drilled along a planned path within the formation. The operating variable may be selected by a user to monitor the progress of the drilling operation as the wellbore is drilled using a drill string along its planned path. For example, the operating variable may be selected by a drilling operator to monitor a response of the drill string to changes in downhole operating conditions over the course of the drilling operation. In some cases, a drilling operator or automated well control system may continuously adjust one or more controllable parameters of the drilling operation to account for such changes. The values of the controllable parameters at any given point during the drilling operation may affect the value of the operating variable. Additionally, the operating variable may be affected by the characteristics of the formation surrounding the wellbore, e.g., as expressed using the regression coefficients described above.

Thus, the estimated values of the operating variable may be a function of the operating variables as represented by the predictive model and the regression coefficients associated with the model. Examples of operating variables that may be used to monitor the progress of the drilling operation include, but are not limited to, hydraulic mechanical specific energy (HMSE) and rate of penetration (ROP). Examples of controllable parameters that may affect values of the operating variable during the operation include, but are not limited to, weight-on-bit (WOB), rotational speed of the drill bit or drill string (e.g., rotational rate applied by the top drive unit in revolutions per minute (RPM)), and an injection or pumping rate (Q) of drilling fluid into the wellbore or pipe disposed therein.

In contrast with the controllable parameters, the regression coefficients associated with the physics-based model may represent various uncontrollable drilling parameters and environment factors that can affect the operating variable at each stage of the drilling operation. Examples of such environmental factors include, but are not limited to, formation mineralogy, strength, density, porosity, permeability, and any other rock property or formation characteristic that may change over the course of the drilling operation. Thus, each coefficient of the physics-based model may represent a particular environmental factor that can change downhole operating conditions and influence values of the operating variable over the course of the drilling operation.

In one or more embodiments, the predictive model may be a hybrid model that combines a physics-based model of the formation with a data-driven model. As will be described in further detail below, the data-driven model of such a hybrid predictive model may be used to track a percentage change in the regression coefficients of the physics-based model as values of an operating variable, e.g., ROP, are estimated over different stages of the drilling operation. Real-time data, including values of one or more controllable parameters (e.g., WOB and/or RPM), may be acquired during a current stage of the drilling operation and applied as inputs to the physics-based model of the hybrid predictive model for estimating values of the operating variable for a subsequent stage of the operation. As additional real-time data is acquired while the wellbore is drilled during the subsequent stage of the operation, any difference between the estimated and actual value of the operating variable that exceeds an error tolerance or threshold may be used to calibrate the physics-based model. This calibration may be performed by recalculating the regression coefficients for the subsequent stage of the drilling operation to be performed. The data-driven portion of the hybrid model in this example may be used to estimate or predict an occurrence of the downhole event of interest along the planned path of the wellbore. As will be described in further detail below, the prediction may be made in response to identifying a correlation between a percentage change in the values of at least one regression coefficient of the physics-based model during the current drilling operation and a similar change in the historical coefficient values observed during prior drilling operations. Such historical changes may be derived from the regression data associated with the predictive model in the regressor database described above. Appropriate adjustments to the planned path of the wellbore may be made to preclude the event from occurring or at least mitigate its effects during the current drilling operation.

Illustrative embodiments and related methodologies of the present disclosure are described below in reference to FIGS. 1-9 as they might be employed in, for example, a computer system for real-time analysis and optimization of drilling parameters over different stages of a drilling operation along a planned well path. In some implementations, such a computer system may be part of an automated control system for interrupting a drilling operation prior to an event, such as drill bit damage, by associating selected regression coefficients of the physics-based model with regression data including the real-time changes in coefficient values tracked by the data-driven model over the different stages of the drilling operation at various depths or points along the well path. The automated control system may alternatively signal a change in lithology, which may in turn prompt adjustments to the drilling plan, such as changing WOB or RPM as a lithological barrier is crossed. For example, the drill bit may be steered in iterative manner as the real-time data is acquired over a period of time during each stage of the drilling operation. At each iteration over the time period, the real-time data acquired for a current stage of the operation may be applied as inputs for training or retraining the neural network model to estimate or predict the operating variable for a subsequent stage along the well path. The operating variable may then be used to estimate or predict optimal values for one or more controllable parameters, and the subsequent stage of the drilling operation may be performed by steering the drill bit through the formation according to the estimated controllable parameter values. In this way, the system may iteratively steer the drill bit and adjust the well path as needed to optimize drilling efficiency, e.g., by maximizing ROP and/or minimizing HMSE.

Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While the illustrated examples may be described in the context of predicting and optimizing ROP and/or HMSE, it should be noted that embodiments are not intended to be limited thereto and that the disclosed parameter optimization techniques may be applied to any of various operating variables as desired for a particular implementation. Also, while a figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Further, unless otherwise noted, even though a figure may depict a cased hole, it should be understood by those skilled in the art that the apparatus according to the present disclosure is equally well suited for use in open hole operations.

FIG. 1 is a diagram showing an example of an offshore drilling system for a subsea drilling operation. In particular, FIG. 1 shows a bottomhole assembly 100 for a subsea drilling operation, where the bottomhole assembly 100 illustratively comprises a drill bit 102 on the distal end of the drill string 104. Various logging-while-drilling (LWD) and measuring-while-drilling (MWD) tools may also be coupled within the bottomhole assembly 100. The distinction between LWD and MWD is sometimes blurred in the industry, but for purposes of this specification and claims LWD tools measure properties of the surrounding formation (e.g., resistivity, porosity, permeability), and MWD tools measure properties associated with the wellbore (e.g., inclination, and direction). In the example system, a logging tool 106 may be coupled just above the drill bit, where the logging tool may collect data associated with the wellbore 108 (e.g., MWD tool), or the logging tool 106 may collect data associated with the surrounding formation (e.g., a LWD tool). In some cases, the bottomhole assembly 100 may comprise a mud motor 112. The mud motor 112 may derive energy from drilling fluid flowing within the drill string 104 and, from the energy extracted, the mud motor 112 may rotate the drill bit 102 (and if present the logging tool 106) separate and apart from rotation imparted to the drill string by surface equipment. Additional logging tools may reside above the mud motor 112 in the drill string, such as illustrative logging tool 114.

The bottomhole assembly 100 is lowered from a drilling platform 116 by way of the drill string 104. The drill string 104 extends through a riser 118 and a well head 120. Drilling equipment supported within and around derrick 123 (illustrative drilling equipment discussed in greater detail with respect to FIG. 2) may rotate the drill string 104, and the rotational motion of the drill string 104 and/or the rotational motion created by the mud motor 112 causes the bit 102 to form the wellbore 108 through the formation material 122. The volume defined between the drill string 104 and the wellbore 108 is referred to as the annulus 125. The wellbore 108 penetrates subterranean zones or layers of a subsurface formation 110. One or more of these zones or layers may contain, for example, a reservoir of hydrocarbons in a commercially viable quantity.

The bottomhole assembly 100 may further comprise a communication subsystem including, for example, a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drill string 104, acoustic telemetry through the pipes of the drill string 104, electromagnetic telemetry, optical fibers embedded in the drill string 104, or combinations thereof). Likewise, the telemetry module 124 may receive information from the surface over one or more of the communication channels.

Figure 2:
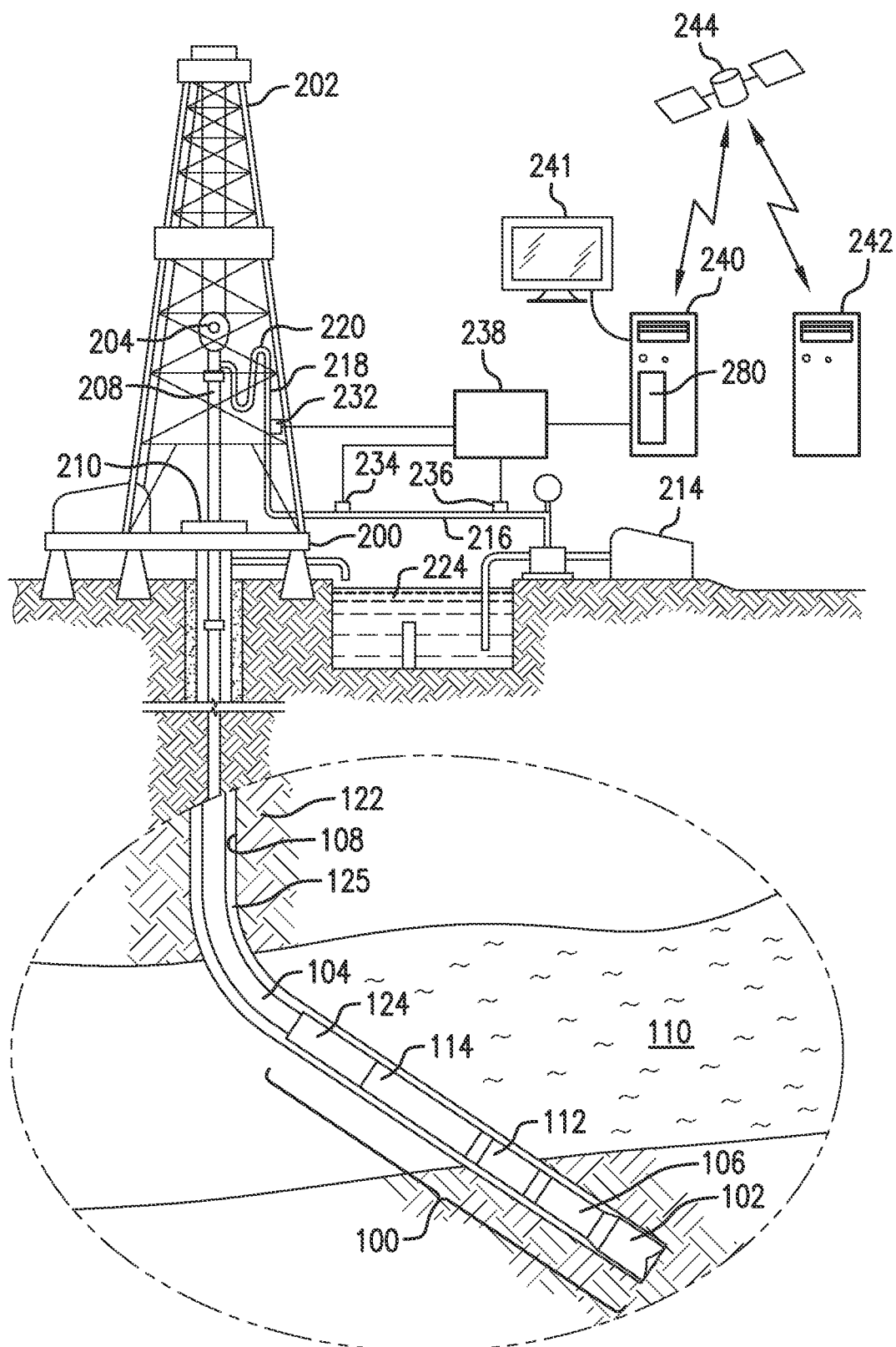
FIG. 2 is a diagram of an onshore drilling system in accordance with one or more embodiments of the present disclosure.

FIG. 2 is a diagram showing an example of an onshore drilling system for performing a land-based drilling operation. In particular, FIG. 2 shows a drilling platform 200 equipped with a derrick 202 that supports a hoist 204. The hoist 204 suspends a top drive 208, which rotates and lowers the drill string 104 through the wellhead 210. Drilling fluid is pumped by mud pump 214 through flow line 216, stand pipe 218, goose neck 220, top drive 208, and down through the drill string 104 at high pressures and volumes to emerge through nozzles or jets in the drill bit 102. The drilling fluid then travels back up the wellbore via the annulus 125, through a blowout preventer (not specifically shown), and into a mud pit 224 on the surface. At the surface of the wellsite, the drilling fluid is cleaned and then circulated again by mud pump 214. The drilling fluid is used to cool the drill bit 102, to carry cuttings from the base of the wellbore 108 to the surface, and to balance the hydrostatic pressure in the rock formations.

In the illustrative case of the telemetry mode 124 encoding data in pressure pulses that propagate to the surface, one or more transducers, e.g., one or more of transducers 232, 234, and 236, convert the pressure signal into electrical signals for a signal digitizer 238 (e.g., an analog-to-digital converter). While only transducers 232, 234, and 236 are illustrated, any number of transducers may be used as desired for a particular implementation. The digitizer 238 supplies a digital form of the pressure signals to a surface computer system 240 or some other form of a data processing device located at the surface of the wellsite. The surface computer system 240 operates in accordance with computer-executable instructions (which may be stored on a computer-readable storage medium) to monitor and control the drilling operation, as will be described in further detail below. Such instructions may be used, for example, to configure the surface computer system 240 to process and decode the downhole signals received from the telemetry mode 124 via digitizer 238.

In one or more embodiments, real-time data collected at the wellsite, including the downhole logging data from the telemetry module 124, may be displayed on a display device 241 coupled to the computer system 240. The representation of the wellsite data may be displayed using any of various display techniques. For example, the surface computer system 240 may generate a two-dimensional (2D) or three-dimensional (3D) graphical representation of the wellsite data for display on the display device 241. In some implementations, the graphical representation of the wellsite data may be displayed along with a representation of the planned well path to enable a user of the computer system 240 to visually monitor or track different stages of the drilling operation along the planned path of the wellbore 108 through formation 110.

In one or more embodiments, the representations of the wellsite data, planned well path and predicted status of equipment, such as drill bit wear, may be displayed within a graphical user interface (GUI) of an application 280 executable at the surface computer system 240 for monitoring and controlling the drilling operation. Application 280 may provide, for example, a set of data analysis and visualization tools for well planning and control. Such tools may allow a user of the surface computer system 240 to monitor different stages of the drilling operation and adjust the drilling plan or planned path of the wellbore 108 as needed. For example, the GUI of the application 280 may include various control elements that the user can manipulate to manually adjust one or more controllable parameters for purposes of controlling the direction and/or orientation of drill bit 102 and path of the wellbore 108. In some implementations, the functions for monitoring and control of the drilling operation may be performed automatically, without any user intervention, by the application 280. In one or more embodiments, the application 280 or automated drilling control functionality thereof may be implemented as part of a drilling optimizer subsystem of the surface computer system 240. An example of such a drilling optimizer will be described in further detail below with respect to FIG. 3.

Figure 3:
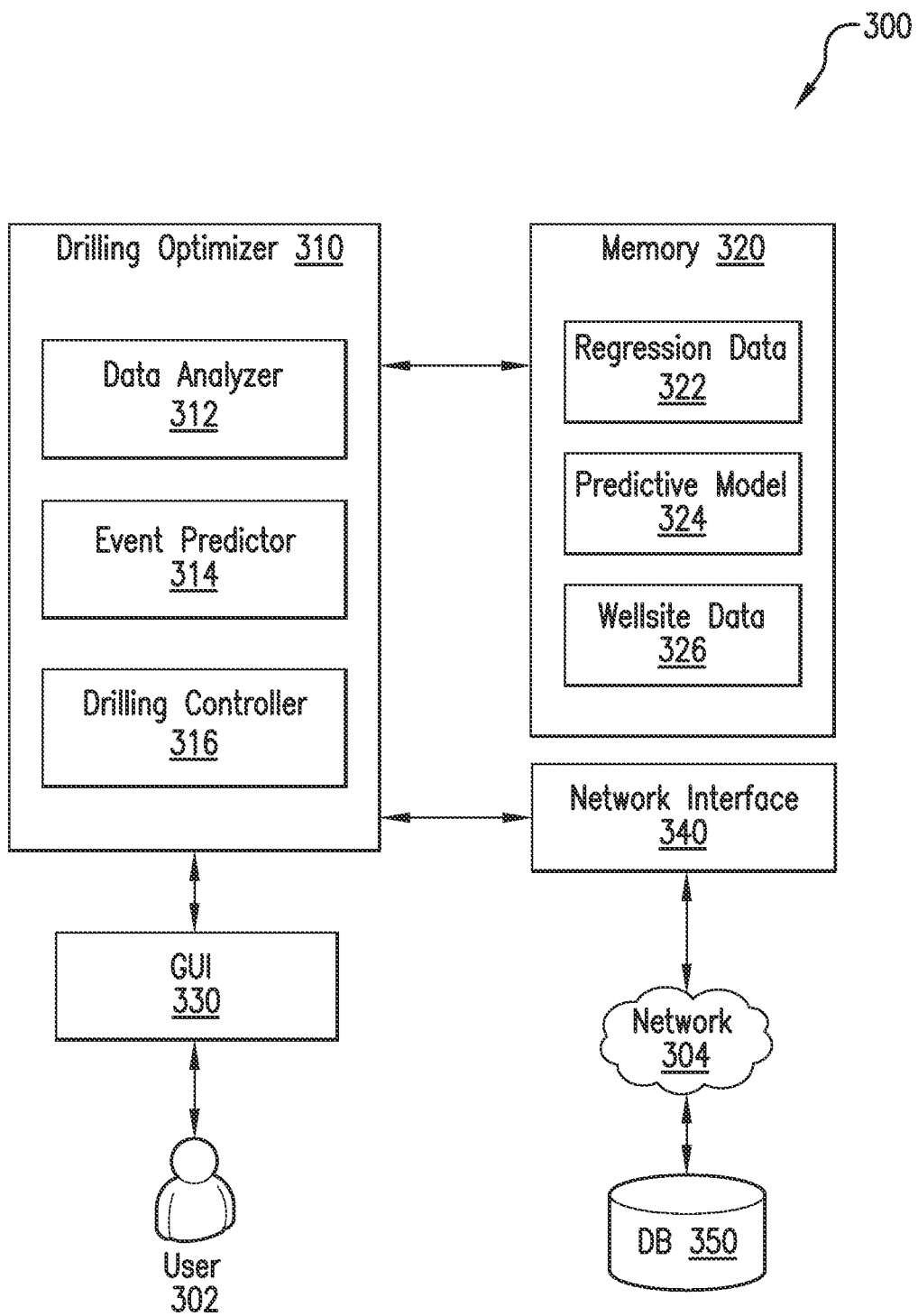
FIG. 3 is a block diagram of a system for real-time data analysis and event prediction to optimize drilling operations within a subsurface formation.

FIG. 3 is a block diagram of a system 300 for real-time data analysis and event prediction to optimize a drilling operation within a subsurface formation. The drilling operation may be an offshore or onshore drilling operation for drilling a wellbore along a planned path within a subsurface formation, as described above with respect to FIGS. 1 and 2. As shown in FIG. 3, system 300 includes a drilling optimizer 310, a memory 320, a GUI 330, and a network interface 340. In one or more embodiments, the drilling optimizer 310 includes a data analyzer 312, an event predictor 314, and a drilling controller 316. Although not shown in FIG. 3, it should be appreciated that system 300 may include additional components and sub-components, which may be used to provide the real-time data analysis and event prediction functionality described herein.

Network interface 340 of system 300 may comprise logic encoded in software, hardware, or combination thereof for communicating with a network 304. For example, network interface 340 may include software supporting one or more communication protocols such that hardware associated with network interface 340 is operable to communicate signals to other computing systems and devices via network 304. Network 304 may be used, for example, to facilitate wireless or wireline communications between system 300 and the other computing systems and devices. In some implementations, system 300 and the other systems and devices may function as separate components of a distributed computing environment in which the components are communicatively coupled via network 304. While not shown in FIG. 3, it should be appreciated that such other systems and devices may include other local or remote computers including, for example and without limitation, one or more client systems, servers, or other devices communicatively coupled via network 304.

Network 304 may be one or any combination of networks including, but not limited to, a local-area, medium-area, or wide-area network, e.g., the Internet. Such network(s) may be all or a portion of an enterprise or secured network. In some instances, a portion of network 304 may be a virtual private network (VPN) between, for example, system 300 and other computers or other electronic devices. Further, all or a portion of the network 304 can include either a wireline or wireless link. Examples of such wireless links include, but are not limited to, 802.11a/b/g/n, 802.20, WiMax, and/or any other appropriate wireless link. Network 304 may encompass any number of internal (private) or external (public) networks, sub-networks, or combination thereof to facilitate communications between various computing components including system 300.

In one or more embodiments, system 300 may use network 304 to communicate with a database 350. Database 350 may be used to store regression data associated with modeling coefficients or regressors for predicting various downhole events of interest during a drilling operation within the subsurface formation, as will be described in further detail below. In some implementations, database 350 may be associated with or located at the operations center of an oilfield services provider, as described above with respect to computer system 242 of FIG. 2.

In one or more embodiments, at least one downhole event of interest to be predicted during the drilling operation may be specified by a user 302 via GUI 330. In some implementations, user 302 may select the event(s) of interest from a menu or list of events displayed in GUI 330. GUI 330 may be displayed using any type of display device (not shown) coupled to system 300. Such a display device may be, for example and without limitation, a cathode ray tubes (CRT), liquid crystal displays (LCD), or light emitting diode (LED) monitor. User 302 may interact with GUI 330 using an input device (not shown) coupled to the system 300. The user input device may be, for example and without limitation, a mouse, a QWERTY or T9 keyboard, a touch-screen, a stylus or other pointer device, a graphics tablet, or a microphone. In some implementations, user 302 may use the information displayed via GUI 330 to assess drilling performance at each stage of the operation and make any manual adjustments to the planned path of the well, e.g., by entering appropriate commands into a drilling operation control module used to control the drilling operations at the wellsite. Alternatively, such adjustments may be made automatically by drilling controller 316, which may function as an automated drilling control system for the wellsite.

In one or more embodiments, data analyzer 312 may communicate with database 350 via network interface 340 and network 304 to retrieve regression data 322 associated with coefficients of a predictive model 324 for a downhole event of interest, e.g., as specified by a user 302 via GUI 330. As shown in FIG. 3, regression data 322, after being retrieved from database 350, and predictive model 324 may be stored in memory 320 of system 300. Regression data 322 may include, for example, a record of changes in historical values of the coefficients associated with prior occurrences of the downhole event detected during previous drilling operations. The previous drilling operations may be associated with other wellsites within the same hydrocarbon producing field or different field with subsurface formation characteristics that are like those of the current wellsite.

As will be described in further detail below, event predictor 314 may use regression data 322 and predictive model 324 to estimate or predict occurrences of the downhole event of interest over different stages of the current drilling operation. The different stages of the drilling operation may correspond to a plurality of segments of the planned path within the subsurface formation. Each segment may correspond to a portion of the wellbore drilled within the formation over a certain distance, depth, or time. Accordingly, the different stages of the drilling operation in some implementations may correspond to a plurality of depth or time intervals over which the wellbore is drilled along the planned path.

In one or more embodiments, predictive model 324 may be a hybrid model that combines a physics-based model of the formation with a data-driven model. Event predictor 314 may use the physics-based model (or physics-based portion) of predictive model 324 to estimate values of an operating variable of the drilling operation, e.g., ROP, based on real-time data acquired by data analyzer 312 from the wellsite during each stage of the drilling operation. Like the event of interest, the operating variable may be specified or selected by user 302 via GUI 330, as described above. The physics-based model may be defined by the coefficients described above and one or more controllable parameters (e.g., WOB and RPM) of the drilling operation that affect the operating variable.

In one or more embodiments, adjustments may be made to the physics-based model over the course of the drilling operation when it is determined that a difference between an estimated value of the operating variable and an actual or measured value thereof exceeds a predetermined error tolerance. For example, values of the coefficients associated with the model may be recalculated based on the real-time data obtained from the wellsite, and the recalculated values may be used to make appropriate adjustments to the physics-based model.

In one or more embodiments, event predictor 314 may use the data-driven model (or data-driven portion) of predictive model 324 to track a percentage change in values of the coefficients of the physics-based model (or physics-based portion) of predictive model 324 between successive stages of the drilling operation. Event predictor 314 may then use the tracked changes to estimate the occurrence of an event of interest during the drilling operation. For example, event predictor 314 may compare the percentage change in the coefficient values being tracked for the current drilling operation with historical changes in coefficient values derived from regression data 322. Based on this comparison, event predictor 314 may identify a correlation between the calculated values tracked for at least one of the coefficients and a corresponding change in the historical coefficient values associated with the prior occurrences of the event of interest. Event predictor 314 may then estimate an occurrence of the event of interest along the planned path of the wellbore, based on the identified correlation.

In one or more embodiments, the data-driven model may be a machine learning model, e.g., a neural network. In one or more embodiments, event predictor 314 may train the machine learning model to identify correlations between the percentage change in values of the coefficients being tracked during the drilling operation and corresponding changes in the historical coefficient values indicated by regression data 322.

In the example shown in FIG. 3, the real-time data acquired from the wellsite during each stage of the drilling operation may be stored in memory 320 as wellsite data 326. Wellsite data 326 may include, for example, current values of controllable parameters, e.g., flow rate (Q), weight on bit (WOB), and drill bit rotational speed (RPM). However, it should be appreciated that embodiments are not limited thereto and that wellsite data 326 may also include any of various measurements or other data collected at the wellsite. Examples of such other data include, but are not limited to, depth (vertical depth within the formation and/or measured depth of the wellbore, whether vertical or deviated), bit size, drill collar length, torque and drag on the string, plastic viscosity, yield point, mud weight, gel strength, downhole pressure, and temperature.

In some implementations, the real-time data may be streamed over network 304 directly from a surface control system (e.g., surface computer system 240 of FIG. 2, as described above) as a real-time data feed to a buffer or storage area designated for wellsite data 326 within memory 320. It should be appreciated that wellsite data 326 may be transmitted and stored using any of various data formats, e.g., an industry standard format such as the wellsite information transfer standard markup language (WITSML).

In one or more embodiments, data analyzer 312 may preprocess the stored wellsite data 326 or real-time data feed as it is received via network 304 from the wellsite. The preprocessing may include, for example, filtering the data into a predetermined sampling rate or drilling rate time series. In some implementations, data analyzer 312 may include one or more data filters for reducing or canceling noise from the real-time data. Examples of such filters include, but are not limited to, a convolution neural network, a band-pass filter, a Kalman filter, a high pass filter, a low pass filter, an average filter, a noise reduction filter, a delay filter, a summation filter, a format conversion filter, and any other type of digital or analog data filters. The preprocessed data may then be classified for use by event predictor 314 in estimating or predicting values of the operating variable over different stages of the drilling operation along the planned path of the wellbore.

In one or more embodiments, data analyzer 312 may dynamically adjust the frequency or rate at which the real-time data is sampled or retrieved for purposes of estimating values of the operating variable during the drilling operation. For example, data analyzer 312 may increase the rate at which wellsite data 326 is acquired during the drilling operation. Increasing data sampling rate in this example may also cause event predictor 314 to estimate the operating variable on a more frequent basis with higher resolution data. In some implementations, the sampling rate and resolution of wellsite data 326 may be adjusted by increasing or decreasing a length or duration of each stage of the drilling operation such that each stage is performed over a relatively longer or shorter distance, depth or time interval along the planned well path within the formation.

In one or more embodiments, data analyzer 312 may include a data frequency selector to select one of several data sampling frequencies for acquiring real-time data during a current stage of the drilling operation along the planned path of the wellbore. The selected data sampling frequency may be intended to increase the rate at which the physics-based model of predictive model 324 produces estimates of the operating variable. Increasing in turn, increase the rate at which any changes made to coefficients of the model (to improve its accuracy) occur. This allows such changes to be tracked with sufficient granularity to detect changes in the underlying formation characteristics and other environmental factors represented by these coefficients, which can lead to an event of interest during the drilling operation. For example, a relatively high data sampling rate is needed to increase the granularity of the data (percentage change in coefficient values) being tracked by event predictor 314, as described above. In one or more embodiments, event predictor 314 may use state-space mapping of the percentage change in coefficient values to estimate or predict occurrences of the event of interest during the drilling operation.

Figure 4:
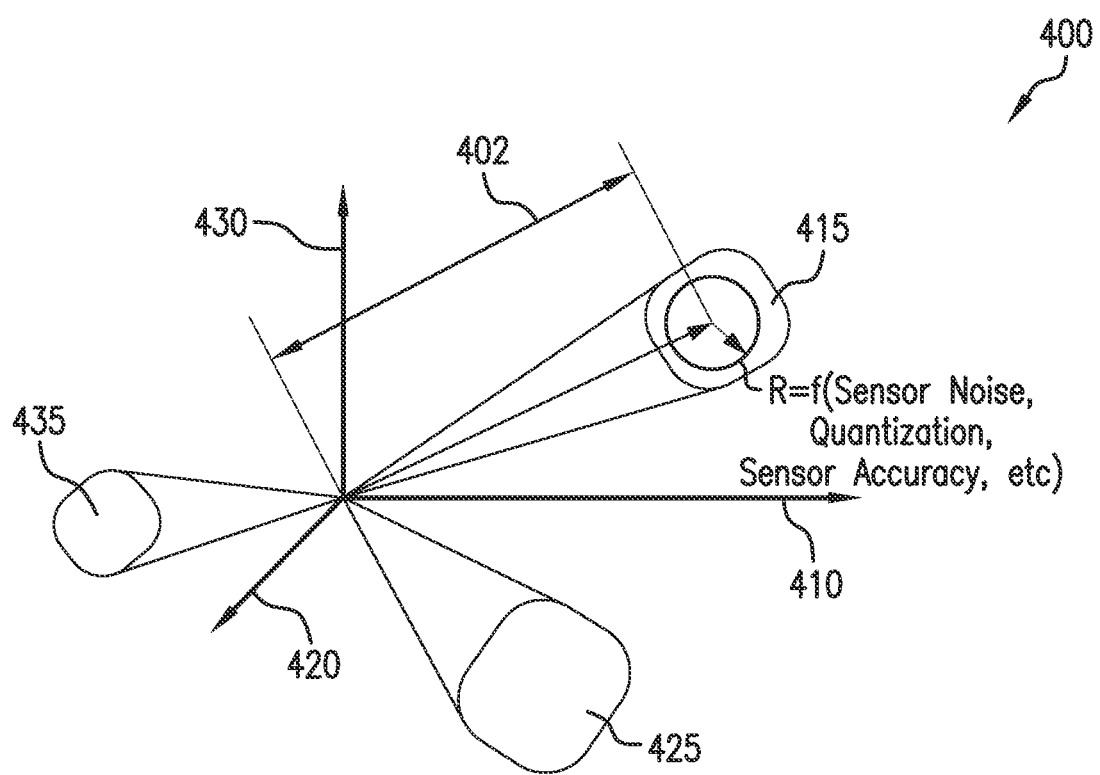
FIG. 4 is a diagram of an illustrative three-dimensional representation of a state-space mapping of a percentage change in coefficients of a hybrid model for predicting different events of interest that may occur during a drilling operation.

FIG. 4 is an illustrative three-dimensional (3D) plot 400 of a state-space mapping between a percentage change in different regression coefficients of a predictive model for a downhole event of interest and an operating variable of a drilling operation. In the example shown in FIG. 4, each of coefficients 410, 420, and 430 of the predictive model are mapped to one of the X, Y, and Z axes of 3D plot 400. While three coefficients (410, 420, and 430) are shown for the mapping in this example, it should be appreciated that embodiments are not intended thereto and that any number of coefficients may be mapped as desired for a particular implementation.

The predictive model may be at least one of a data-driven or machine learning model, a physics-based model, or a hybrid model that combines both data-driven and physics-based modeling techniques. As described above, the physics-based portion of such a hybrid predictive model may be used to estimate values of the operating variable based on values of the coefficients and real-time data acquired from sensors at the wellsite. In one or more embodiments, the values of one or more of coefficients 410, 420, and 430 may be adjusted or recalculated over the course of the drilling operation, based on differences between the estimated and actual values of the operating variable.

As shown in FIG. 4, a percentage change in the values that may be tracked for each of coefficients 410, 420, and 430 may fall within cone-shaped 3D spaces 415, 425, and 435 of 3D plot 400, respectively. The size of the cone for each of 3D spaces 415, 425, and 435 may be defined by an error size 402 corresponding to a length of the cone and a maximum radius "R" of the cone. The maximum radius of each cone may be defined by an error function "f" based on various sources of error in the real-time data used to calculate the coefficient values and estimate values of the operating variable. The sources of error may include, for example and without limitation, sensor noise, quantization, sensor accuracy, and any other potential source of error in the real-time data acquired from the wellsite.

Figure 5:
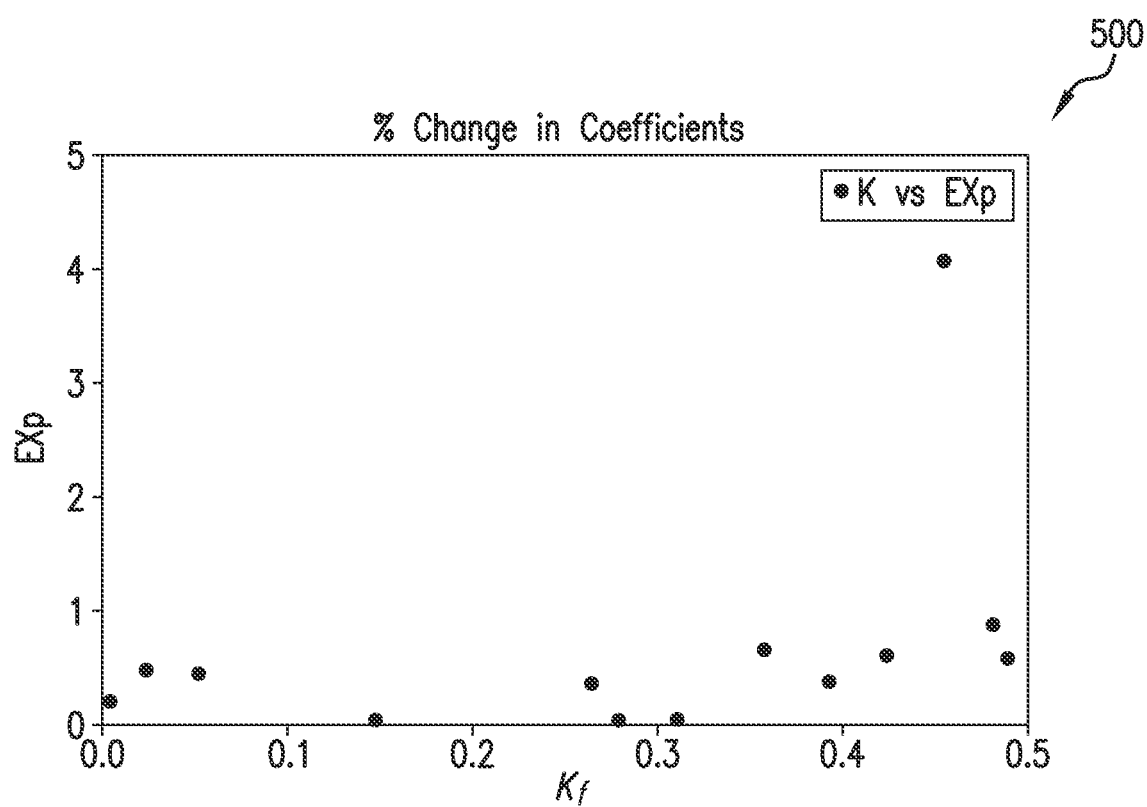
FIG. 5 is a two-dimensional plot of a percentage change in the coefficients of a physics-based model for predicting drilling events as a function of depth.

FIG. 5 is a two-dimensional (2D) plot 500 of a percentage change in the coefficients of a predictive model as a function of depth. The predictive model in this example may be used to estimate values of ROP. However, it should be appreciated that embodiments are not limited thereto and that predictive models for estimating values of any operating variable of a drilling operation may be used as desired for a particular implementation. For example, the predictive model (or physics-based portion thereof) may be defined by an expression that relates the ROP to the product of a bit rate and a weight-on-bit (e.g., "RPM×WOB"), as raised by an exponent ("Exp") and then multiplied by a constant ("$K_f$"). The exponent Exp and constant $K_f$ may serve as the coefficients of the predictive model and a percentage change in values of these coefficients may be tracked over different stages of the drilling operation in this example. As shown in FIG. 5, each of these coefficients may be mapped to one of the X, Y axes of 2D plot 500. The changes in these coefficients may be tracked using, for example, a combination of machine-learning model (e.g., a neural network) and a physics-based (ROP) model as described above.

FIG. 6 is a 3D plot 600 of a percentage change in coefficients of a ROP model as a function of drilling depth. The percentage change in coefficients can lead to predictive outcomes with respect to various downhole events of interest, for example, drill-string failures or changes in formation lithology, or other events that may lead to NPT or ILT.

Returning to system 300 of FIG. 3, the above-described predictive modeling and event prediction operations may be performed by drilling optimizer 314. In one or more embodiments, drilling controller 316 may adjust the planned path of the wellbore, based on the estimated occurrence of the event of interest. For example, drilling controller 316 may automatically adjust the values of one or more parameters for controlling a direction, orientation, speed, etc. of the drill string used to drill the wellbore within the formation.

In some implementations, drilling controller 316 may provide the adjusted values as control inputs to a downhole geosteering tool (not shown), which may be used to steer the drill bit and wellbore along a planned or adjusted path through the formation. For example, the drilling controller 316 may be communicatively coupled to the downhole geosteering tool via a wireless or wired (e.g., wireline) communication interface (not shown) of system 300. Such a communication interface may be used by the drilling controller 316 to transmit the drilling parameter values as control signals to the downhole geosteering tool. The control signals may allow the drilling controller 316 to control, for example, the direction and orientation of the geosteering tool and thereby, adjust the planned path of the well during the drilling operation.

Figure 7A:
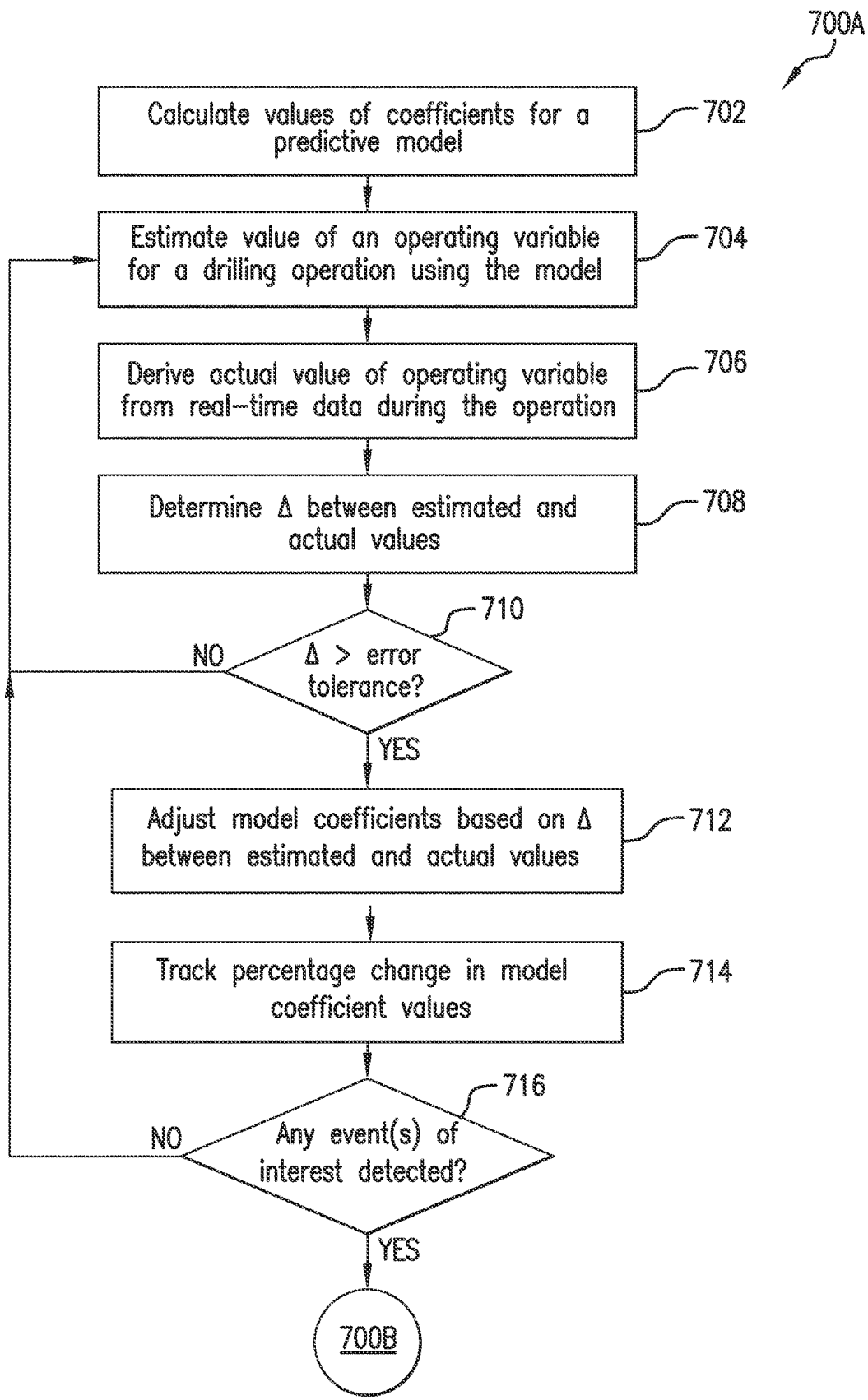
FIGS. 7A and 7B are flowcharts of illustrative processes for detecting one or more downhole events of interest during a drilling operation and associating the detected event(s) with changes in regression coefficients of predictive model in a regressor database for predicting such events during subsequent drilling operations.
Figure 7B:
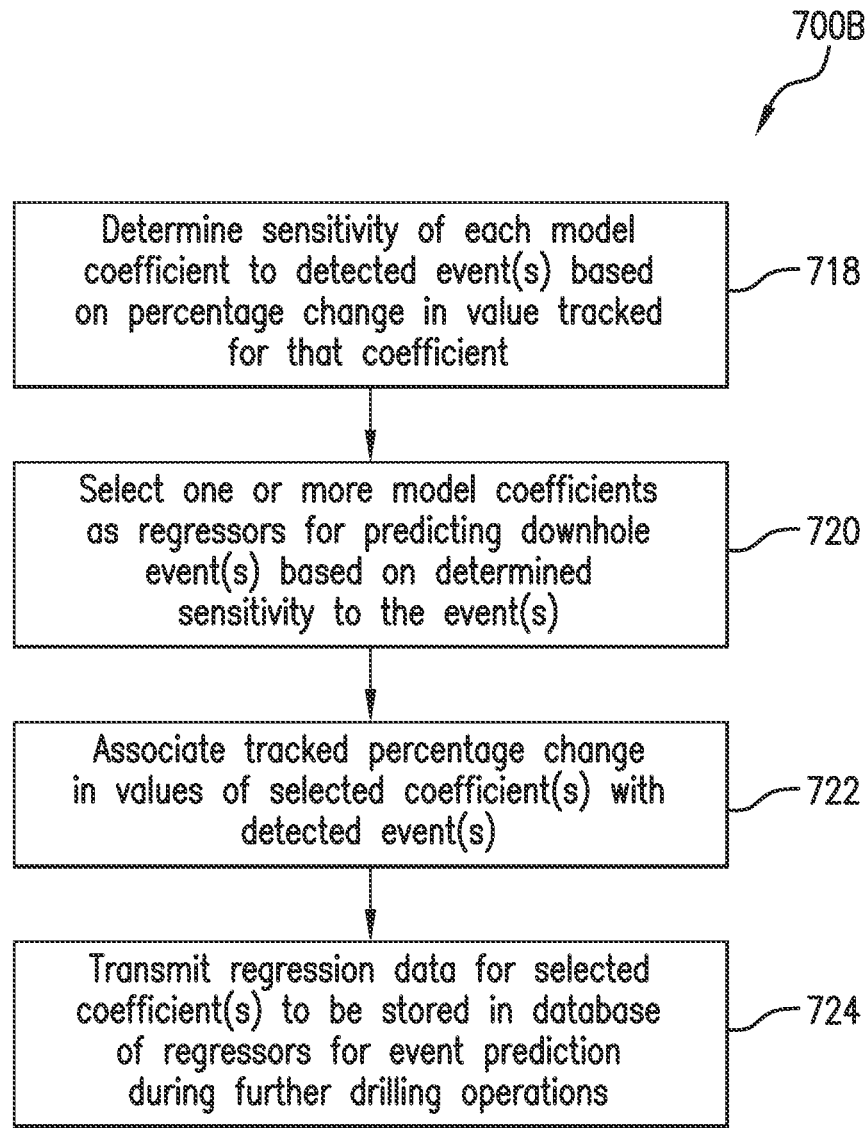

FIGS. 7A and 7B are flowcharts of illustrative processes 700A and 700B, respectively, for detecting one or more downhole events of interest during a drilling operation and associating the detected event(s) with changes in regression coefficients of predictive model in a regressor database for predicting such events during subsequent drilling operations. As described above, the drilling operation may involve drilling a wellbore along a planned path through one or more layers of a subsurface reservoir formation. Examples of such downhole events include, but are not limited to, a change in one or more characteristics of the subsurface formation, a kick along a portion of the planned path of the wellbore within the subsurface formation, and a failure of drilling equipment during the drilling operation. For purposes of discussion and explanation, processes 700A and 700B will be described using system 300 of FIG. 3, as described above. For example, processes 700A and 700B may be performed using system 300, e.g., by one or more components of drilling optimizer 310. However, processes 700A and 700B are not intended to be limited thereto.

As shown in FIG. 7A, process 700A begins in block 702, which includes calculating values of coefficients for a predictive model, e.g., predictive model 324 of FIG. 3, as described above. In one or more embodiments, the predictive model may be a hybrid model including a physics-based model of the formation in combination with a data-driven model, e.g., a neural network or other type of machine learning model.

In block 704, the physics-based model of the predictive model in this example may be used to estimate a value of an operating variable of the drilling operation for a subsequent stage of the drilling operation, based on the calculated values of the coefficients and real-time data, e.g., wellsite data 326 of FIG. 3, as described above, acquired from the wellsite during a current stage of the drilling operation. The operating variable may be, for example, a rate of penetration (ROP) of a drill string used to drill the wellbore along its planned path within the subsurface formation, as described above.

In block 706, an actual or measured value of the operating variable is derived from real-time data acquired during the drilling operation.

In blocks 708 and 710, it is determined whether any difference ("A") between the estimated and actual values of the operating variable exceed an error tolerance.

If it is determined in block 710 that a difference between the estimated and actual values does not exceed the error tolerance, process 700A returns to block 704 and the operations in blocks 704, 706, 708 and 710 are repeated for additional stages of the drilling operation along the planned path of the wellbore.

However, if it is determined in block 710 that a difference between the estimated and actual values of the operating variable exceeds the error tolerance, process 700A proceeds to block 712, which includes adjusting model coefficients based on the difference between these values. The adjustment in block 712 may include recalculating the values of the coefficients, based on the difference.

In block 714, a percentage change in the values of the model coefficients is tracked between successive stages of the drilling operation.

Block 716 includes determining whether any downhole event of interest was detected during the preceding stage of the drilling operation. If no event of interest was detected, process 700A returns to block 704 and the above-described operations in blocks 704, 706, 708, 710, 712, 714 and 716 are repeated for additional stages of the drilling operation along the planned path of the wellbore. On the other hand, if at least one event of interest was detected, process 700A proceeds to block 718 of process 700B in FIG. 7B.

As shown in FIG. 7B, block 718 includes determining a sensitivity of each coefficient of the predictive model to the event(s) that occurred during the preceding stage of the drilling operation, based on the percentage change in value tracked for that coefficient.

In block 720, one or more of the model coefficients are selected as regressors for predicting the particular downhole event(s) during subsequent drilling operations or subsequent stages of the current drilling operation, based on the sensitivity of each coefficient to the event(s).

In block 722, the percentage change in values of the selected coefficient(s), as tracked in block 714 of FIG. 7A, is associated with occurrence of the event(s), as detected in block 716 of FIG. 7A.

In block 724, regression data for the event(s) of interest, including the associated percentage change in coefficient values, is transmitted to a database, e.g., database 350 of FIG. 3, as described above, which may be used to store regressors for predicting or estimating future occurrences of the event(s) during further drilling operations. For example, the regression data, including the tracked percentage change in the values of the selected coefficient(s), may be stored within the database in association with the event of interest. As will be described in further detail below with respect to FIG. 8, the regression data associated with the coefficient(s) may be retrieved from the database during a subsequent drilling operation and used to estimate the likelihood of the same event(s) of interest occurring during the subsequent drilling operation.

Figure 8:
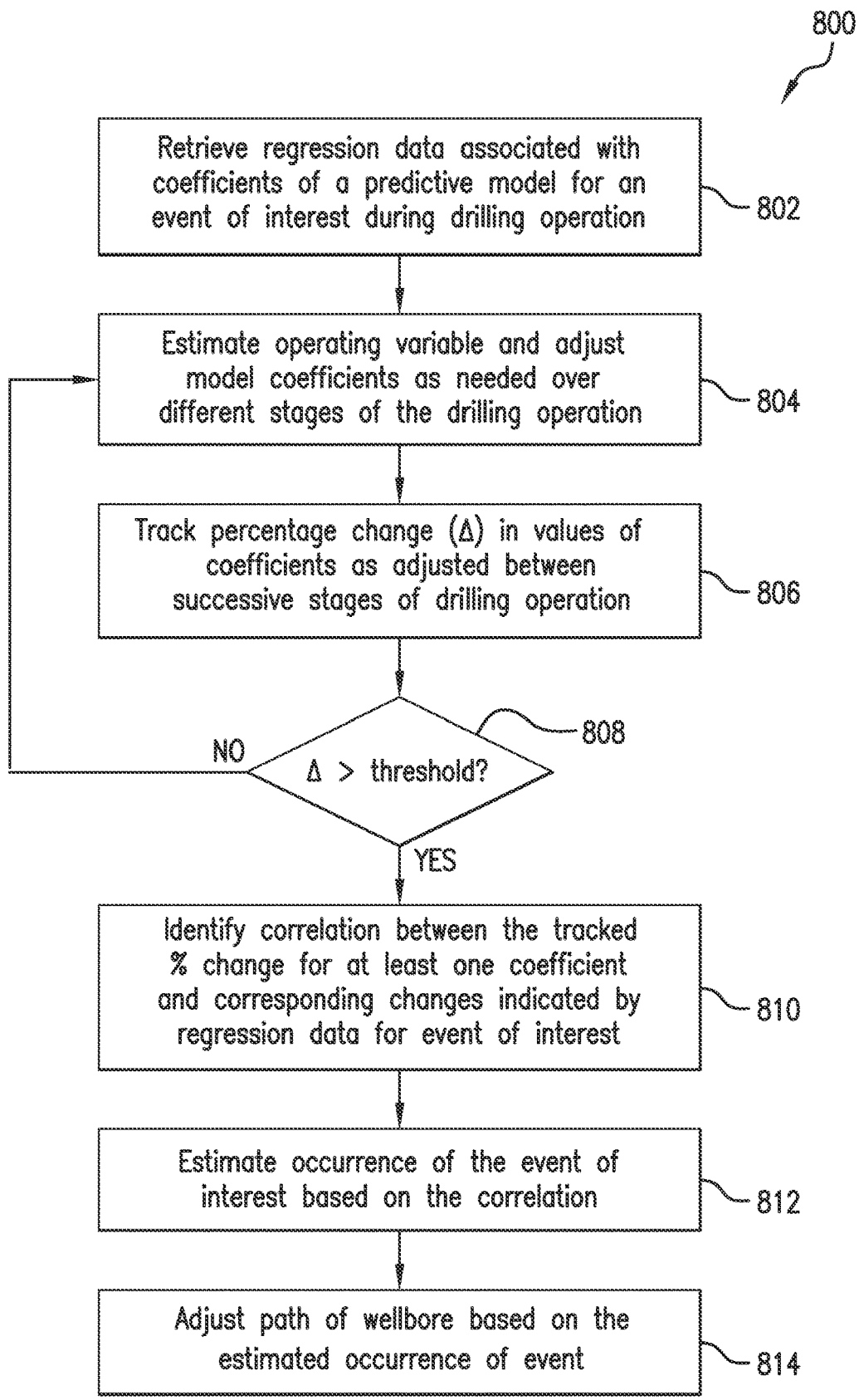
FIG. 8 is a flowchart of an illustrative process for predicting downhole events of interest during a drilling operation based on tracked coefficient changes and regression data obtained from the regressor database of FIGS. 7A and 7B.

FIG. 8 is a flowchart of an illustrative process 800 for predicting downhole events of interest during a drilling operation based on tracked coefficient changes and regression data obtained from the regressor database, as described above with respect to FIGS. 7A and 7B. Like processes 700A and 700B of FIGS. 7A and 7B, process 800 will be described using system 300 of FIG. 3, as described above, for discussion purposes but is not intended to be limited thereto. Also, like processes 700A and 700B, process 800 may be performed using system 300, e.g., by one or more components of drilling optimizer 310.

As shown in FIG. 8, process 800 begins in block 802, which includes retrieving regression data associated with coefficients of a predictive model for a downhole event of interest during a drilling operation along a planned path of a wellbore within a subsurface formation. The predictive model may be similar to the hybrid model including a physics-based model in combination with a data-driven model as described above. The regression data may be retrieved from a database, e.g., database 350 of FIG. 3, as described above, over a communication network, e.g., network 304 of FIG. 3. The regression data may include a record of changes in historical coefficient values associated with prior occurrences of the downhole event. The prior occurrences of the event may have been detected, for example, in block 716 of process 700A in FIG. 7A and stored in the database after being transmitted in block 724 of process 700B in FIG. 7B, as described above, during one or more previous drilling operations (or previous stages of the current drilling operation).

Process 800 then proceeds to block 804, which includes estimating a value of an operating variable, e.g., ROP, as the wellbore is drilled over different stages of the drilling operation along the planned path. The value of the operating variable in block 804 may be estimated for a subsequent stage of the operation based on values of the coefficients of the predictive model and real-time data acquired during a current stage of the drilling operation. As described above, the values of the coefficients may be adjusted as needed between successive stages of the drilling operation when it is determined that a difference between the estimated value and an actual value of the operating variable derived from the real-time data exceeds an error tolerance.

Block 806 includes tracking a percentage change ($\Delta$) in the values of the coefficients as adjusted between successive stages of the drilling operation along the planned path of the wellbore.

If it is determined that the percentage change being tracked in block 806 exceeds a predetermined threshold or error tolerance in block 808, process 800 proceeds to block 810, which includes identifying a correlation between the tracked percentage change for at least one of the coefficients and a corresponding change in historical values of the coefficient as indicated by the regression data retrieved in block 802. The regression data may include, for example, historical values of each model coefficient associated with the prior occurrences of the event of interest as detected during previous drilling operations/stages, as described above. Otherwise, process 800 returns to block 804 and the operations in blocks 804, 806 and 808 are repeated for additional stages of the drilling operation along the planned path of the wellbore. It should be appreciated that the identifying operation in block 810 may include comparing the current and historical coefficient value changes associated with the particular event of interest and determining whether a correlation exists based on the comparison.

The correlation identified in block 810 may then be used in block 812 to estimate an occurrence of the event of interest along the planned path of the wellbore during the current operation.

In block 814, the planned path of the wellbore may be adjusted based on the estimation in block 812. Block 814 may include, for example, adjusting one or more controllable parameters affecting the operating variable, e.g., ROP, during the drilling operation to reduce the likelihood of the event occurring as estimated or predicted in block 812. The controllable parameters that may be adjusted may include, for example, one or more of a weight-on-bit (WOB), a rotational speed (RPM) of a drill string or drill bit attached thereto, and a pumping rate of drilling fluid for one or more subsequent stages of the drilling operation to be performed.

Figure 9:
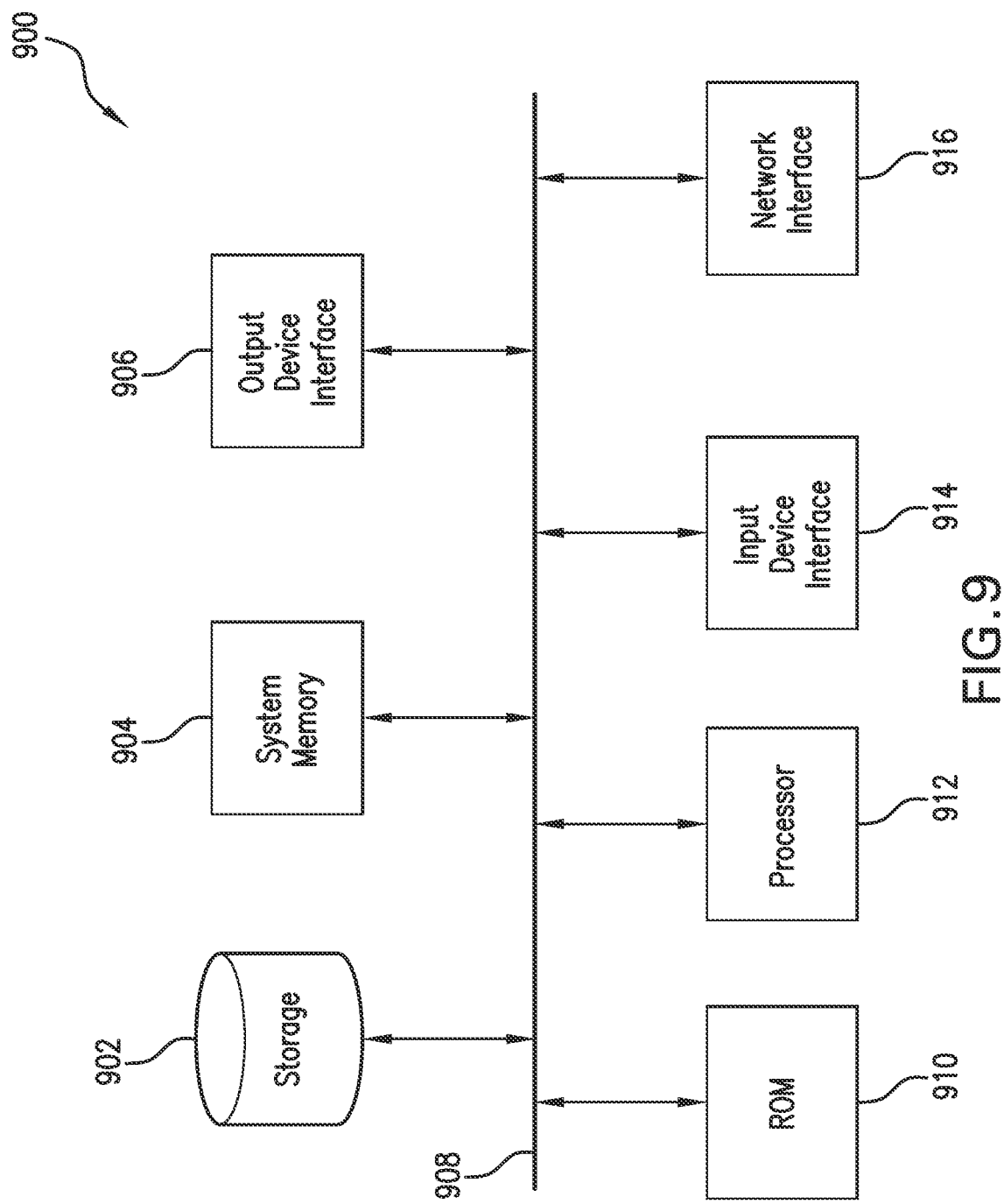
FIG. 9 is a block diagram of an illustrative computer system in which one or more embodiments may be implemented.

FIG. 9 is a block diagram of an illustrative computer system 900 in which embodiments of the present disclosure may be implemented. For example, processes 700A, 700B, and 800 of FIGS. 7A, 7B, and 8, respectively, as described above, and system 300 of FIG. 3, as described above, may be implemented using computer system 900. System 900 can be a computer, phone, PDA, or any other type of electronic device. Such an electronic device includes various types of computer readable media and interfaces for various other types of computer readable media. As shown in FIG. 9, system 900 includes a permanent storage device 902, a system memory 904, an output device interface 906, a system communications bus 908, a read-only memory (ROM) 910, processing unit(s) 912, an input device interface 914, and a network interface 916.

Bus 908 collectively represents all system, peripheral, and chipset buses that communicatively connect the numerous internal devices of system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of system 900. Permanent storage device 902, on the other hand, is a read-and-write memory device. This device is a non-volatile memory unit that stores instructions and data even when system 900 is powered off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. For example, the various memory units include instructions for computer aided pipe string design based on existing string designs in accordance with some implementations. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the system 900. Input devices used with input device interface 914 include, for example, alphanumeric, QWERTY, or T9 keyboards, microphones, and pointing devices (also called "cursor control devices"). Output device interfaces 906 enables, for example, the display of images generated by the system 900. Output devices used with output device interface 906 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 9, bus 908 also couples system 900 to a public or private network (not shown) or combination of networks through a network interface 916. Such a network may include, for example, a local area network ("LAN"), such as an Intranet, or a wide area network ("WAN"), such as the Internet. Any or all components of system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 1000 of FIG. 10 and the functions or operations performed by system 300 of FIG. 3, as described above, may be implemented using system 900 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for real-time data analysis and prediction of downhole events for purposes of optimizing drilling operations within a subsurface formation. For example, a computer-implemented method for predicting events of interest during drilling operations is described, where the method includes: retrieving, by a computer system from a database over a communication network, regression data associated with coefficients of a predictive model for a downhole event during a drilling operation along a planned path of a wellbore within a subsurface formation, the regression data including a record of changes in histori-cal coefficient values associated with prior occurrences of the downhole event; estimating a value of an operating variable as the wellbore is drilled over different stages of the drilling operation along the planned path, based on values of the coefficients of the predictive model and real-time data acquired during each stage of the drilling operation, wherein the values of the coefficients are adjusted between successive stages of the drilling operation when a difference between the estimated value and an actual value of the operating variable derived from the real-time data exceeds an error tolerance; tracking a percentage change in the values of the coefficients as adjusted between successive stages of the drilling operation along the planned path of the wellbore; identifying a correlation between the percentage change in the values tracked for at least one of the coefficients and a corresponding change in the historical coefficient values associated with the prior occurrences of the downhole event; estimating an occurrence of the downhole event along the planned path of the wellbore, based on the identified correlation; and adjusting the planned path of the wellbore, based on the estimated occurrence of the downhole event.

Likewise, embodiments of a computer-readable storage medium having instructions stored therein have been described, where the instructions, when executed by a processor, may cause the processor to perform a plurality of functions, including functions to: retrieve, from a database over a communication network, regression data associated with coefficients of a predictive model for a downhole event during a drilling operation along a planned path of a wellbore within a subsurface formation, the regression data including a record of changes in historical coefficient values associated with prior occurrences of the downhole event; estimate a value of an operating variable as the wellbore is drilled over different stages of the drilling operation along the planned path, based on values of the coefficients of the predictive model and real-time data acquired during each stage of the drilling operation, wherein the values of the coefficients are adjusted between successive stages of the drilling operation when a difference between the estimated value and an actual value of the operating variable derived from the real-time data exceeds an error tolerance; track a percentage change in the values of the coefficients as adjusted between successive stages of the drilling operation along the planned path of the wellbore; identify a correlation between the percentage change in the values tracked for at least one of the coefficients and a corresponding change in the historical coefficient values associated with the prior occurrences of the downhole event; estimate an occurrence of the downhole event along the planned path of the wellbore, based on the identified correlation; and adjust the planned path of the wellbore, based on the estimated occurrence of the downhole event.

The foregoing embodiments of the method or computer-readable storage medium may include any one or any combination of the following elements, features, functions, or operations: the predictive model is a hybrid model including a physics-based model in combination with a data-driven model, the physics-based model is used to estimate values of the operating variable of the drilling operation based on the calculated values of the coefficients and the real-time data, the values of the coefficients are recalculated for making adjustments to the physics-based model over the different stages of the drilling operation based on the real-time data acquired during each stage, and the data-driven model is used to track the percentage change in the values of the coefficients as the adjustments to the physics-based model are made between successive stages of the drilling operation; the data-driven model is a machine learning model, and the machine learning model is trained to identify correlations between the percentage change in values of the coefficients being tracked during the drilling operation and corresponding changes in the historical coefficient values indicated by the regression data; estimating a value of an operating variable during each stage of the drilling operation using the physics-based model as defined by the values of the coefficients at that stage, determining whether a difference between the estimated value and an actual value of the operating variable derived from the real-time data exceeds an error tolerance, and when it is determined that the difference exceeds the error tolerance, recalculating the values of the coefficients, based on the difference; the physics-based model is used to estimate an operating variable of the drilling operation, and the operating variable is at least one of a hydraulic mechanical specific energy (HMSE) or a rate of penetration (ROP) of a drill string used to drill the wellbore within the subsurface formation; adjusting the planned path of the wellbore comprises adjusting one or more controllable parameters affecting the operating variable during the drilling operation; the one or more controllable parameters are selected from the group consisting of a weight-on-bit (WOB), a rotational speed of a drill bit, and a pumping rate of drilling fluid; the downhole event is selected from the group consisting of a change in one or more characteristics of the subsurface formation, a kick along a portion of the planned path of the wellbore within the subsurface formation, and a failure of drilling equipment during the drilling operation; the tracking and the identifying are performed for values calculated for each of a plurality of coefficients of the predictive model, and the elements, functions, or operations further include determining a sensitivity of each of the plurality of coefficients to the downhole event based on an amount of the percentage change in the values of that coefficient between consecutive stages of the drilling operation, selecting one or more of the plurality of coefficients as regressors for estimating occurrences of the downhole event during subsequent drilling operations based on the relative sensitivity of each coefficient to the downhole event, and transmitting to the database regression data including the tracked percentage change in the values of the selected one or more coefficients to be stored within the database in association with the downhole event; and the different stages of the drilling operation correspond to a plurality of segments of the planned path within the subsurface formation, where each segment is defined by at least one of a predetermined length or depth interval, and the identifying of the correlation is performed in response to determining that the percentage change in the values tracked for at least one of the coefficients exceeds a predetermined threshold between successive stages of the drilling operation corresponding to consecutive segments of the planned path.

Furthermore, a system is described above, where the system includes at least one processor and a memory coupled to the processor having instructions stored therein, which when executed by the processor, cause the processor to perform functions including functions to: retrieve, from a database over a communication network, regression data associated with coefficients of a predictive model for a downhole event during a drilling operation along a planned path of a wellbore within a subsurface formation, the regression data including a record of changes in historical coefficient values associated with prior occurrences of the downhole event; estimate a value of an operating variable as the wellbore is drilled over different stages of the drilling operation along the planned path, based on values of the coefficients of the predictive model and real-time data acquired during each stage of the drilling operation, wherein the values of the coefficients are adjusted between successive stages of the drilling operation when a difference between the estimated value and an actual value of the operating variable derived from the real-time data exceeds an error tolerance; track a percentage change in the values of the coefficients as adjusted between successive stages of the drilling operation along the planned path of the wellbore; identify a correlation between the percentage change in the values tracked for at least one of the coefficients and a corresponding change in the historical coefficient values associated with the prior occurrences of the downhole event; estimate an occurrence of the downhole event along the planned path of the wellbore, based on the identified correlation; and adjust the planned path of the wellbore, based on the estimated occurrence of the downhole event.

The foregoing embodiments of the system may include any one or any combination of the following elements, features, functions, or operations: the predictive model is a hybrid model including a physics-based model in combination with a data-driven model, the physics-based model is used to estimate values of the operating variable of the drilling operation based on the calculated values of the coefficients and the real-time data, the values of the coefficients are recalculated for making adjustments to the physics-based model over the different stages of the drilling operation based on the real-time data acquired during each stage, and the data-driven model is used to track the percentage change in the values of the coefficients as the adjustments to the physics-based model are made between successive stages of the drilling operation; the data-driven model is a machine learning model, and the machine learning model is trained to identify correlations between the percentage change in values of the coefficients being tracked during the drilling operation and corresponding changes in the historical coefficient values indicated by the regression data; estimating a value of an operating variable during each stage of the drilling operation using the physics-based model as defined by the values of the coefficients at that stage, determining whether a difference between the estimated value and an actual value of the operating variable derived from the real-time data exceeds an error tolerance, and when it is determined that the difference exceeds the error tolerance, recalculating the values of the coefficients, based on the difference; the physics-based model is used to estimate an operating variable of the drilling operation, and the operating variable is at least one of a hydraulic mechanical specific energy (HMSE) or a rate of penetration (ROP) of a drill string used to drill the wellbore within the subsurface formation; adjusting the planned path of the wellbore comprises adjusting one or more controllable parameters affecting the operating variable during the drilling operation; the one or more controllable parameters are selected from the group consisting of a weight-on-bit (WOB), a rotational speed of a drill bit, and a pumping rate of drilling fluid; the downhole event is selected from the group consisting of a change in one or more characteristics of the subsurface formation, a kick along a portion of the planned path of the wellbore within the subsurface formation, and a failure of drilling equipment during the drilling operation; the tracking and the identifying are performed for values calculated for each of a plurality of coefficients of the predictive model, and the elements, functions, or operations further include determining a sensitivity of each of the plurality of coefficients to the downhole event based on an amount of the percentage change in the values of that coefficient between consecutive stages of the drilling operation, selecting one or more of the plurality of coefficients as regressors for estimating occurrences of the downhole event during subsequent drilling operations based on the relative sensitivity of each coefficient to the downhole event, and transmitting to the database regression data including the tracked percentage change in the values of the selected one or more coefficients to be stored within the database in association with the downhole event; and the different stages of the drilling operation correspond to a plurality of segments of the planned path within the subsurface formation, where each segment is defined by at least one of a predetermined length or depth interval, and the identifying of the correlation is performed in response to determining that the percentage change in the values tracked for at least one of the coefficients exceeds a predetermined threshold between successive stages of the drilling operation corresponding to consecutive segments of the planned path.

While specific details about the above embodiments have been described, the above hardware and software descriptions are intended merely as example embodiments and are not intended to limit the structure or implementation of the disclosed embodiments. For instance, although many other internal components of the system 900 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method for event prediction during drilling operations, the method comprising:
    retrieving, by a computer system from a database over a communication network, regression data associated with coefficients of a predictive model for a downhole event during a drilling operation along a planned path of a wellbore within a subsurface formation, the regression data including a record of changes in historical coefficient values associated with prior occurrences of the downhole event;
    estimating a value of an operating variable as the wellbore is drilled over different stages of the drilling operation along the planned path, based on values of the coefficients of the predictive model and real-time data acquired during each stage of the drilling operation, wherein the values of the coefficients are adjusted between successive stages of the drilling operation when a difference between the estimated value and an actual value of the operating variable derived from the real-time data exceeds an error tolerance;
    tracking a percentage change in the values of the coefficients as adjusted between successive stages of the drilling operation along the planned path of the wellbore;
    identifying a correlation between the percentage change in the values tracked for at least one of the coefficients and a corresponding change in the historical coefficient values associated with the prior occurrences of the downhole event;
    estimating an occurrence of the downhole event along the planned path of the wellbore, based on the identified correlation; and
    adjusting the planned path of the wellbore, based on the estimated occurrence of the downhole event, wherein the wellbore is drilled according to the adjusted planned path.

2. The method of claim 1, wherein the predictive model is a hybrid model including a physics-based model in combination with a data-driven model, the physics-based model is used to estimate values of the operating variable of the drilling operation based on the calculated values of the coefficients and the real-time data, the values of the coefficients are recalculated for making adjustments to the physics-based model over the different stages of the drilling operation based on the real-time data acquired during each stage, and the data-driven model is used to track the percentage change in the values of the coefficients as the adjustments to the physics-based model are made between successive stages of the drilling operation.

3. The method of claim 2, wherein the data-driven model is a machine learning model, and the method further comprises training the machine learning model to identify correlations between the percentage change in values of the coefficients being tracked during the drilling operation and corresponding changes in the historical coefficient values indicated by the regression data.

4. The method of claim 2, further comprising:
estimating a value of an operating variable during each stage of the drilling operation using the physics-based model as defined by the values of the coefficients at that stage;
determining whether a difference between the estimated value and an actual value of the operating variable derived from the real-time data exceeds an error tolerance; and
when it is determined that the difference exceeds the error tolerance, recalculating the values of the coefficients, based on the difference.

5. The method of claim 2, wherein the physics-based model is used to estimate an operating variable of the drilling operation, and the operating variable is at least one of a hydraulic mechanical specific energy (HMSE) or a rate of penetration (ROP) of a drill string used to drill the wellbore within the subsurface formation.

6. The method of claim 5, wherein adjusting the planned path of the wellbore comprises adjusting one or more controllable parameters affecting the operating variable during the drilling operation.

7. The method of claim 6, wherein the one or more controllable parameters are selected from the group consisting of: a weight-on-bit (WOB); a rotational speed of a drill bit; and a pumping rate of drilling fluid.

8. The method of claim 1, wherein the downhole event is selected from the group consisting of: a change in one or more characteristics of the subsurface formation; a kick along a portion of the planned path of the wellbore within the subsurface formation; and a failure of drilling equipment during the drilling operation.

9. The method of claim 1, wherein the tracking and the identifying are performed for values calculated for each of a plurality of coefficients of the predictive model, and the method further comprises:
determining a sensitivity of each of the plurality of coefficients to the downhole event, based on an amount of the percentage change in the values of that coefficient between consecutive stages of the drilling operation;
selecting one or more of the plurality of coefficients as regressors for estimating occurrences of the downhole event during subsequent drilling operations, based on a relative sensitivity of each coefficient to the downhole event; and
transmitting, to the database, regression data including the tracked percentage change in the values of the selected one or more coefficients to be stored within the database in association with the downhole event.

10. The method of claim 1, wherein the different stages of the drilling operation correspond to a plurality of segments of the planned path within the subsurface formation, each segment is defined by at least one of a predetermined length or depth interval, and the identifying of the correlation is performed in response to determining that the percentage change in the values tracked for at least one of the coefficients exceeds a predetermined threshold between successive stages of the drilling operation corresponding to consecutive segments of the planned path.

11. A system comprising:
at least one processor; and
a memory coupled to the processor and having processor-executable instructions stored therein, which, when executed by the processor, cause the processor to perform a plurality of functions, including functions to:
retrieve, from a database over a communication network, regression data associated with coefficients of a predictive model for a downhole event during a drilling operation along a planned path of a wellbore within a subsurface formation, the regression data including a record of changes in historical coefficient values associated with prior occurrences of the downhole event;
estimate a value of an operating variable as the wellbore is drilled over different stages of the drilling operation along the planned path, based on values of the coefficients of the predictive model and real-time data acquired during each stage of the drilling operation, wherein the values of the coefficients are adjusted between successive stages of the drilling operation when a difference between the estimated value and an actual value of the operating variable derived from the real-time data exceeds an error tolerance;
track a percentage change in the values of the coefficients as adjusted between successive stages of the drilling operation along the planned path of the wellbore;
identify a correlation between the percentage change in the values tracked for at least one of the coefficients and a corresponding change in the historical coefficient values associated with the prior occurrences of the downhole event;
estimate an occurrence of the downhole event along the planned path of the wellbore, based on the identified correlation;
adjust the planned path of the wellbore, based on the estimated occurrence of the downhole event; and
control drilling of the wellbore according to the adjusted planned path.

12. The system of claim 11, wherein the predictive model is a hybrid model including a physics-based model in combination with a data-driven model, the physics-based model is used to estimate values of the operating variable of the drilling operation based on the calculated values of the coefficients and the real-time data, the values of the coefficients are recalculated for making adjustments to the physics-based model over the different stages of the drilling operation based on the real-time data acquired during each stage, and the data- driven model is used to track the percentage change in the values of the coefficients as the adjustments to the physics-based model are made between successive stages of the drilling operation.

13. The system of claim 12, wherein the data-driven model is a machine learning model, and the functions performed by the processor further include functions to:
train the machine learning model to identify correlations between the percentage change in values of the coefficients being tracked during the drilling operation and corresponding changes in the historical coefficient values indicated by the regression data.

14. The system of claim 12, wherein the functions performed by the processor further include functions to:
  estimate a value of an operating variable during each stage of the drilling operation using the physics-based model as defined by the values of the coefficients at that stage;
  determine whether a difference between the estimated value and an actual value of the operating variable derived from the real-time data exceeds an error tolerance; and
  recalculate the values of the coefficients based on the difference, when it is determined that the difference exceeds the error tolerance.

15. The system of claim 12, wherein the physics-based model is used to estimate an operating variable of the drilling operation, and the operating variable is at least one of a hydraulic mechanical specific energy (HMSE) or a rate of penetration (ROP) of a drill string used to drill the wellbore within the subsurface formation.

16. The system of claim 15, wherein the planned path of the wellbore is adjusted by adjusting one or more controllable parameters affecting the operating variable during the drilling operation, and the one or more controllable parameters are selected from the group consisting of a weight-on-bit (WOB); a rotational speed of a drill bit; and a pumping rate of drilling fluid.

17. The system of claim 11, wherein the downhole event is selected from the group consisting of a change in one or more characteristics of the subsurface formation; a kick along a portion of the planned path of the wellbore within the subsurface formation; and a failure of drilling equipment during the drilling operation.

18. The system of claim 11, wherein the functions performed by the processor further include functions to:
  determine a sensitivity of each coefficient of the predictive model to the downhole event, based on an amount of the percentage change in the values of that coefficient between consecutive stages of the drilling operation;
  select one or more of the coefficients as regressors for estimating occurrences of the downhole event during subsequent drilling operations, based on a relative sensitivity of each coefficient to the downhole event; and
  transmit, to the database, regression data including the tracked percentage change in the values of the selected one or more coefficients to be stored within the database in association with the downhole event.

19. The system of claim 11, wherein the different stages of the drilling operation correspond to a plurality of segments of the planned path within the subsurface formation, each segment is defined by at least one of a predetermined length or depth interval, and the correlation is identified in response to a determination that the percentage change in the values tracked for at least one of the coefficients exceeds a predetermined threshold between successive stages of the drilling operation corresponding to consecutive segments of the planned path.

20. A computer-readable storage medium having instructions stored therein, which when executed by a computer cause the computer to perform a plurality of functions, including functions to:
  retrieve, from a database over a communication network, regression data associated with coefficients of a predictive model for a downhole event during a drilling operation along a planned path of a wellbore within a subsurface formation, the regression data including a record of changes in historical coefficient values associated with prior occurrences of the downhole event;
  estimate a value of an operating variable as the wellbore is drilled over different stages of the drilling operation along the planned path, based on values of the coefficients of the predictive model and real-time data acquired during each stage of the drilling operation, wherein the values of the coefficients are adjusted between successive stages of the drilling operation when a difference between the estimated value and an actual value of the operating variable derived from the real-time data exceeds an error tolerance;
  track a percentage change in the values of the coefficients as adjusted between successive stages of the drilling operation along the planned path of the wellbore;
  identify a correlation between the percentage change in the values tracked for at least one of the coefficients and a corresponding change in the historical coefficient values associated with the prior occurrences of the downhole event;
  estimate an occurrence of the downhole event along the planned path of the wellbore, based on the identified correlation;
  adjust the planned path of the wellbore, based on the estimated occurrence of the downhole event; and
  control drilling of the wellbore according to the adjusted planned path.

* * * * *